Patented Sept. 19, 1933

1,927,148

UNITED STATES PATENT OFFICE 1,927,148

WATER TREATMENT

Abraham S. Behrman, Chicago, Ill., assignor to General Zeolite Co., Chicago, Ill., a corporation of Illinois No Drawing. Application July 21, 1931
Serial No. 552,289

11 Claims. (Cl. 210—23)

This invention relates to the treatment of liquids, and particularly to the treatment of water. It is especially directed to providing improved means for treating water to render it more suitable for use as domestic supply or for industrial purposes.

The hardness of water is caused primarily by the compounds of calcium and magnesium which it contains. In softening hard water the calcium and magnesium are either precipitated in the form of relatively insoluble compounds, or are replaced without precipitation by exchange with a base, such as sodium, which does not cause hardness.

Of the precipitation processes, treatment with lime or with lime and soda is by far the most commonly practiced method, due both to the economy and simplicity of the process and to the reduction of dissolved solids effected by the bodily removal of most of the bicarbonate hardness. For convenience and brevity in designation, the treatment with lime or with lime and soda is commonly referred to as the "lime-soda" process; and the same terminology will be employed here.

In the lime-soda process the calcium is precipitated as calcium carbonate and the magnesium as magnesium hydroxide. To bring about as complete precipitation of these compounds as practicable, it is customary to employ slightly more than the theoretical amounts of reagents required for the reaction. A water that has been treated with lime therefore usually contains an appreciable amount of calcium hydroxide.

In lime-soda softening, as in all precipitation processes, the reaction may be visualized as producing momentarily a relatively large supersaturation with the newly formed solutes, i. e. calcium carbonate and magnesium hydroxide. As precipitation progresses, the degree of supersaturation progressively diminishes until, if precipitation is complete, the condition of supersaturation entirely disappears and there is left in the solution the amount of solute corresponding to the theoretical solubility.

Unfortunately, this completeness of precipitation does not occur in cold process lime-soda softening, even after the period of four hours or longer usually allowed for reaction and sedimentation, unless one employs a larger excess of the reagents, which excess must later be removed. Specifically, the theoretical solubility of calcium carbonate in cold water free from carbon dioxide is about sixteen parts per million, and of magnesium hydroxide about six to nine parts per million. In actual practice, however, the amount of calcium carbonate and magnesium hydroxide normally remaining in a water after cold process lime-soda softening is never as low as this theoretical solubility and may range from 50 to 100 parts per million.

From the standpoint of the lime-soda softening of community water supplies, the most objectionable feature of this incomplete precipitation of calcium carbonate and magnesium hydroxide within the treating apparatus lies in the fact that precipitation occurs later. Thus when the treated water comes in contact with the surfaces of water mains and other portions of the distribution system, the calcium carbonate in excess of the theoretical solubility tends to deposit on the surfaces. In time this "after-precipitation", as it is called, frequently progresses to the point where small pipes are completely obstructed, and the flow through the larger mains is greatly reduced.

Although coagulants and other means have been proposed for overcoming after precipitation by securing more complete precipitation or other action, the only method that has been found entirely successful is the application to the treated water of carbon dioxide gas. There are several reasons for preferring this method. All, or as much as desired, of the calcium carbonate and magnesium hydroxide in the softened water may be converted to the soluble calcium and magnesium bicarbonates, which do not so precipitate. Also the taste of the softened water is greatly improved, the gas is produced very cheaply from a variety of fuels, and, due to the fact that carbonic acid is a very weak acid, its use does not require extremely careful and continuous control, since occasional errors of even appreciable magnitude in application of the gas cannot produce dangerous results.

Because of the advantages above enumerated, it has now become standard practice to equip lime-soda softening plants in large communities with means for recarbonating the softened water. For this there is usually provided means for liberating the carbon dioxide, such as a coke furnace or a gas or oil burner, though sometimes waste combustion gases from a nearby boiler plant are employed. In any case, the hot combustion gases containing carbon dioxide are cooled and scrubbed, then freed from entrained water, and finally compressed and delivered through a pipe grid system to the softened water.

It is evident from this description that the equipment required for applying carbon dioxide gas to the softened water is relatively elaborate and expensive.

Furthermore, experience has demonstrated that economical maintenance and operation of this equipment are not always readily accomplished. For example, serious corrosion of scrubbers and of compressors or blowers has been of frequent occurrence. The cost of power for driving the compressors or blowers, and of the water for scrubbing and cooling the gases may amount to very appreciable items. Again, complete utilization of all the carbon dioxide is sometimes made difficult by the design of the water softening plant proper, with consequent escape of carbon dioxide. Labor also is often an important consideration, since the process, including as it does the step of combustion, requires considerable supervision and attention.

In a large softening plant the cost of installation and maintenance of the equipment required is readily justified by the low unit cost of the carbon dioxide obtained in this way; but in a small plant the fixed charges on the equipment plus the attention required for operating it, are frequently burdensome and often actually prohibitive.

The principal object of this invention is to make possible the application of carbon dioxide to lime-soda softened water without the use or necessity of the elaborate equipment hitherto required for the generation, purification, and application of the gas.

Another object of the invention is to provide a source of carbon dioxide and method of application that will be so simple and inexpensive that even the smallest lime-soda softening plant will be able to afford recarbonation.

Another object of the invention is to provide a method for providing simultaneous recarbonation and coagulation of the softened water.

Another object of the invention is to provide a simple and inexpensive method of sterilizing water in conjunction with the recarbonating.

Another object of the invention is to provide a method for generating carbon dioxide of such purity that no cooling or purification will be required.

Another object of the invention is to provide a method for applying carbon dioxide to the softened water which does not require the use of compressors, blowers, or other application of power or external pressure.

Other objects of the invention will become apparent from the description of the invention and from the appended claims.

Briefly stated, the invention comprises the addition to the softened water of a dry substance which, on wetting will liberate carbon dioxide in the water and thus recarbonate it. Preferably employed for this purpose is an intimate mixture of a bicarbonate of an alkali metal and an acidic substance capable of reacting therewith when the mixture is brought into contact with water.

A typical example of the invention is the employment of a dry and non-hygroscopic mixture of sodium bicarbonate and niter cake (sodium acid sulphate). When a dry mixture containing the proper proportions of these constituents is brought into contact with water, carbon dioxide is liberated in accordance with the chemical reaction shown by the following equation:

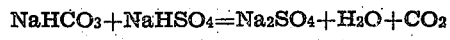
$$NaHCO_3 + NaHSO_4 = Na_2SO_4 + H_2O + CO_2$$

From this equation it is evident that, working with pure substances, the theoretically equivalent proportions of the reagents are 100 parts by weight of sodium bicarbonate and 143 parts by weight of sodium bisulphate. Preferably, however, the proportion of the two reagents is adjusted to provide a slight excess of sodium bicarbonate, taking into consideration the varying degree of impurity of commercial grades of sodium bisulphate, the strength of which should be determined in each case by chemical analysis. Obviously simultaneous recarbonation and coagulation can be obtained by the use of other acid-reacting salts of aluminum, iron, or other metals whose hydroxides can function as coagulants. When ferrous salts e. g. ferrous sulphate is employed, an additional advantage from the standpoint of the prevention of corrosion of metal surfaces is the reduction in dissolved oxygen which results from the oxidation of the ferrous hydroxide first formed, to the ferric condition. A similar reduction in dissolved oxygen may be secured by replacing the ferrous sulphate in the recarbonation mixture with anhydrous sodium acid sulfite, which is now available commercially. Instead of a single acid-reacting substance a plurality of such substances may be employed, as for example aluminum sulphate and ferric sulphate, in order to combine the advantages of the more gelatinous nature of the aluminum hydroxide and the greater weight of the ferric hydroxide; or aluminum sulphate and niter cake may be used as the acid-reacting constituent, in order to decrease the amount of aluminum hydroxide formed that must subsequently be removed by sedimentation and/or filtration.

In general, I prefer to use the alkaline and the acidic constituents in such proportions that there will be a slight, but definite excess alkalinity. A distinct advantage of this procedure is that even if a large excess of the mixture is supplied through error to the water, no mineral acidity can appear in the final effluent which will be detrimental either to the health of consumers or to the metal of the distribution system.

Calcium and magnesium carbonates, because of their cheapness, suggest themselves as possible sources of carbon dioxide when employed in accordance with my invention. In general these materials will not be found desirable, due to the increase in the hardness of the water resulting from their use.

If desired, a diluent, such as calcium phosphate or other inert material may be incorporated with the active ingredients of the mixture, in order to increase the volume fed, or to prevent the absorption of moisture by the mixture and consequent premature reaction.

I prefer in general to add the recarbonation mixture to the water by means of a suitable dry chemical feeder, feeders of this type being well known in the art, and to make the addition to the water at one or more points in the sedimentation chamber, or in the outlet from the sedimentation chamber and before the water is filtered. In this way incrustation of the filter sand is prevented, and, in addition, advantage is taken of the coagulation secured from the reaction mixture when one of the constituents of the mixture is a coagulant. Additional sedimentation may be provided after the addition of the recarbonation mixture and before filtering.

Once the proper dose of the recarbonation mixture for a given water has been determined and the feeding device adjusted accordingly, the recarbonation proceeds with little or no attention except occasional refilling of the hopper of the feeder. Under the conditions of prevalent practice, an average of about 250 lbs. of carbon dioxide will be required to recarbonate one million gallons of water.

In applying the recarbonation mixture to the water, it is important that this should be done in a way which will minimize loss of carbon dioxide. One satisfactory method is to have the mixture brought in contact with water under the surface of the water; or the mixture may be dropped into a funnel into which the water to be treated is also entering; or the dry mixture may be injected with air into the water; or the mixture may be dissolved in a minor flow of the water (the minor flow being in a closed system, if desired) which is then combined with the principal flow. Many other methods may be devised for insuring the solution of the mixture without appreciable loss of carbon dioxide.

In a modification of the invention, which I consider less desirable than the process above described, a relatively large amount of the recarbonation mixture is placed in a closed container. Water is allowed to enter this container at a predetermined rate corresponding to the flow of water through the softening plant. The carbon dioxide gas liberated as a result of the reaction is delivered by its own pressure, or by applied pressure or suction to the water to be recarbonated. In such case suitable liquid seals and other devices may be provided to make the functioning of the equipment as nearly automatic and continuous as possible. The principal advantage of this method of application of the carbon dioxide is that the amount of dissolved solids in the treated water is not increased.

In another modification of the invention, there is included in the recarbonation mixture a predetermined amount of a sterilizing agent, such as dry calcium hypochlorite; while in still another modification, powdered activated carbon may be included with the recarbonation mixture for the purpose of removing the residual tastes and odors.

It has become established practice to sterilize water by the addition to it of chlorine, either in the gaseous form or in some compound such as sodium or calcium hypochlorite. Devices for the feeding of chlorine in gaseous form are known but these are relatively expensive and not entirely satisfactory when the amount to be fed is very small. The same is true of devices for feeding a solution of an active chlorine compound such as calcium hypochlorite, this method having the added disadvantage that fresh solution must be frequently prepared. Both the liquid or gaseous chlorine and the chlorine solution are very corrosive.

The difficulties caused by the nature of chlorine and its active compounds as well as those arising from the feeding of the small amount required are avoided by my improved method. Also there is the saving due to the entire elimination of any special apparatus for feeding the chlorine and the care thereof. Apart from other consideration, the very small amount of chlorine compound required would make its feeding in dry form very difficult if not impossible. For the sterilization of all ordinary waters it is only necessary to add about one per cent of dry calcium hypochlorite to my recarbonating mixture and this is readily incorporated at the time the other ingredients are mixed.

In like manner a material such as powdered activated carbon can be at times advantageously incorporated with my recarbonating mixture.

The amount of the carbon required for removal of taste or odor from most waters is very small, being of the order of one-half grain per gallon. To directly feed this amount to large flows, say of a million gallons per day, is readily accomplished but there is no satisfactory way of feeding such a proportion to small flows without inaccuracy and waste. By incorporation of the carbon in my recarbonating mixture the desired feed is readily obtained without extra expense, apparatus or care.

It may be at times desirable to incorporate more than one treating reagent within my recarbonating mixture. In doing this, however, care should be taken that the various ingredients are not incompatible. Thus activated carbon and a chlorinating substance should not be so combined since if added to the water together the carbon would quickly remove the chlorine and so prevent sterilization.

I am aware that it has been proposed hitherto to treat raw waters requiring coagulation for the removal of sediment or color, but which are of too low alkalinity to precipitate the coagulant, with an alkaline reagent such as the hydrate or carbonate of sodium or calcium, this being added at the same time as, before or after the coagulant. Such a step or process is, however, essentially different from what I propose, being directed to supplying alkalinity to a water deficient therein in order to secure precipitation of the coagulant whereas my invention is directed to neutralizing or altering the excessive or objectionable alkalinity of a water resulting from previous treatment thereof in order to avoid after precipitation or other injurious effects of such alkalinity. I expressly disclaim from the scope of my invention and claims the use of such dry mixtures as proposed herein for the purpose of effecting coagulation of raw waters.

Various modifications of my invention within its proper scope, and other alterations in the method of its utilization will suggest themselves to those skilled in the art; but all such modifications and alterations are contemplated as coming within the scope of my invention which is not to be limited except as necessitated by the prior art, short of the broadest permissible interpretation of the appended claims.

What I claim is:

1. The process of treating lime-softened water which comprises mixing with it a dry mixture capable of liberating carbon dioxide on wetting.

2. The process of preventing after-precipitation in lime-treated water which comprises treating the water with a dry substance capable of liberating carbon dioxide on wetting.

3. In the softening of water by precipitation processes the step which comprises mixing with the softened water a dry mixture which will liberate carbon dioxide on wetting, the amount of dry substance employed being sufficient to prevent after-precipitation.

4. The process of recarbonating lime-treated water which comprises mixing it with a dry mixture composed of acid and alkaline components capable of liberating carbon dioxide on coming in contact with the water.

5. In the softening of water by a precipitation process, the improvement which comprises recarbonating and coagulating the softened water by mixing it with a dry substance capable of forming carbon dioxide and a coagulant upon mixing with water.

6. In the softening of water by a precipitation process, the improvement which comprises recarbonating and coagulating the softened water by treating it with a dry mixture of aluminum sulphate and sodium bicarbonate.

7. In the softening of water by a precipitation process, the improvement which comprises recarbonating and coagulating the softened water by treating it with a dry mixture of aluminum sulphate and sodium bicarbonate, the proportion of sodium bicarbonate being slightly in excess of that theoretically required to react with the aluminum sulphate.

8. The process of preventing after-precipitation in lime-treated water comprising treating the water with a dry substance capable of liberating carbon dioxide on wetting, the application of the dry substance being made in such a manner as to insure the absorption of substantially all of the carbon dioxide by the water being treated.

9. The process of recarbonating lime-treated water which comprises treating it with a dry mixture, the components of which will by mutual reaction form carbon dioxide when the mixture is wetted with water.

10. The process of recarbonating lime-treated water which comprises liberating carbon dioxide by the action of water on a dry mixture and dissolving the gas in the water.

11. The process of purifying water that comprises first treating the water with lime to effect precipitation of dissolved impurities, then subjecting the water to sedimentation for removal of suspended particles and then recarbonating the water by the application of a mixture capable of liberating carbon dioxide on wetting.

ABRAHAM S. BEHRMAN.